(12) United States Patent
Mulligan

(10) Patent No.: US 7,850,256 B2
(45) Date of Patent: Dec. 14, 2010

(54) DUAL-BUSHING TRACK CHAIN CARTRIDGE

(75) Inventor: Patrick J. Mulligan, Dubuque, IA (US)

(73) Assignee: Deere & Company, Moline, IL (US)

( * ) Notice: Subject to any disclaimer, the term of this patent is extended or adjusted under 35 U.S.C. 154(b) by 133 days.

(21) Appl. No.: 12/257,976

(22) Filed: Oct. 24, 2008

(65) Prior Publication Data

US 2010/0102624 A1 Apr. 29, 2010

(51) Int. Cl.
*F16F 1/34* (2006.01)
*B60B 19/00* (2006.01)
*F16G 13/02* (2006.01)

(52) U.S. Cl. .................... 305/104; 305/118; 305/202

(58) Field of Classification Search ......... 305/101–106, 305/118, 201–202, 204
See application file for complete search history.

(56) References Cited

U.S. PATENT DOCUMENTS

| | | | |
|---|---|---|---|
| 3,469,891 A | 9/1969 | Deli | |
| 3,492,054 A | 1/1970 | Boggs et al. | |
| 3,606,497 A | 9/1971 | Gilles | |
| 3,762,778 A | 10/1973 | Boggs et al. | |
| RE30,039 E | 6/1979 | Clemens et al. | |
| 4,199,199 A | 4/1980 | Granda | |
| 4,244,588 A | 1/1981 | Langewisch | |
| 4,251,182 A | 2/1981 | Schroeder | |
| 4,560,174 A | 12/1985 | Bisi | |
| 4,818,041 A | 4/1989 | Oertley | |
| 4,840,438 A | 6/1989 | Cory | |
| 5,069,509 A * | 12/1991 | Johnson et al. | ............. 305/118 |
| 5,183,318 A | 2/1993 | Taft et al. | |
| 5,511,869 A | 4/1996 | Edwards et al. | |
| 6,206,491 B1 | 3/2001 | Hisamatsu | |
| 6,371,577 B1 | 4/2002 | Hasselbusch et al. | |
| 6,382,742 B1 | 5/2002 | Hasselbusch et al. | |
| 6,454,366 B1 | 9/2002 | Egle | |
| 6,739,680 B2 | 5/2004 | Hasselbusch et al. | |
| 6,783,129 B2 | 8/2004 | Akita et al. | |
| 7,240,973 B2 * | 7/2007 | Takayama | ................... 305/103 |
| 7,347,513 B2 | 3/2008 | Johannsen et al. | |
| 2003/0219181 A1 | 11/2003 | Yamamoto et al. | |
| 2004/0114993 A1 | 6/2004 | Anderton et al. | |
| 2004/0228676 A1 | 11/2004 | Oertley | |
| 2006/0251349 A1 | 11/2006 | Schmeling et al. | |
| 2008/0073972 A1 | 3/2008 | Mulligan et al. | |
| 2008/0231110 A1 | 9/2008 | Mulligan et al. | |
| 2009/0102281 A1* | 4/2009 | Diekevers et al. | ........... 305/104 |

FOREIGN PATENT DOCUMENTS

| | | |
|---|---|---|
| EP | 0860352 | 7/2003 |
| EP | 1391371 A | 2/2004 |
| WO | 81/00545 A | 3/1981 |
| WO | 8908577 | 9/1989 |
| WO | 2008/093160 A1 | 8/2008 |

OTHER PUBLICATIONS

Communication from the European Patent Office dated Nov. 28, 2007 (6 pages).

(Continued)

*Primary Examiner*—Jason R Bellinger

(57) ABSTRACT

An endless track chairs for use with a track-type vehicle comprises a cartridge joined to the links of first and second link sets for relative rotation between the link sets.

18 Claims, 5 Drawing Sheets

OTHER PUBLICATIONS

CASE Extended Life Track Information (1 page) (prior art).
Cat® SystemOne™ Undercarriage Information (7 pages) (prior art).
Deere J Dozers Product Brochure (24 pages (prior art).
Drawings Of Prior Art Systems (2 pages) (prior art).
Statement About Track Chain Joints (3 pages) (prior art).
Track Joint Seal Of Deere 850J Crawler (1 page) (prior art).

* cited by examiner

DUAL-BUSHING TRACK CHAIN CARTRIDGE

FIELD OF THE DISCLOSURE

The present disclosure relates to an endless track chain for a track-type vehicle, and, more particularly, to a track chain cartridge that acts as a joint for relative rotation between links of the track chain.

BACKGROUND OF THE DISCLOSURE

Track-type vehicles (e.g., crawlers, excavators, tracked tree-felling machines) have an undercarriage typically with at least one track on each side of the vehicle. Each track typically includes an endless track chain, with ground-engaging shoes mounted thereon, trained about a drive sprocket, one or more idlers, and rollers. In many cases, each track chain includes a number of joints, each such joint interconnecting a first link set, having a first link and a second link, and a second link set, having a third link and a fourth link, for relative rotation between the first and second link sets as the track advances through its closed-loop path.

SUMMARY OF THE DISCLOSURE

According to the present disclosure, there is provided an endless track chain for use with a track-type vehicle. The endless track chain comprises a first link set, a second link set, and a cartridge. The first link set comprises a first link and a second link. The second link set comprises a third link and a fourth link. The cartridge is joined to and distinct from the first and second links and the third and fourth links for relative rotation between the first and second link sets.

The cartridge comprises a pin, an inner bushing journalled on the pin for relative rotation therebetween, an outer bushing journalled on the inner bushing for relative rotation therebetween, annular first and second spacers, first and second collars, annular first and second inboard seals, and annular first and second outboard seals. The first and second spacers are positioned axially outboard of the outer bushing, are fixed to the inner bushing, and are fixed respectively to the first and second links. The first and second collars are positioned respectively axially out board of the first and second spacers, are fixed to the pin, and are fixed respectively to the third and fourth links. The first and second inboard seals are captured between the outer bushing and the first and second spacers. The first and second outboard seals are captured between the first and second spacers and the first and second collars.

The first and second spacers and the first and second collars may have different outermost outside diameters to facilitate introduction and removal of the cartridge to and from the links. For example, the outermost outside diameters of the spacers and collars increase in axially sequential order. The outermost outside diameter of the first spacer is greater than the outermost outside diameter of the first collar, the outermost outside diameter of the second spacer is greater than the outermost outside diameter of the first spacer, and the outermost outside diameter of the second collar is greater than the outermost outside diameter of the second spacer. As such, the spacers, and collars can be press-fit to their respective links without undue surface scoring before reaching such links.

The cartridge is designed for chain torsional rigidity and efficiency ("torsional rigidity" refers to the chain's resistance to twisting about its longitudinal axis). Fixation of the first and second spacers to the inner bushing and respectively to the first and second links promotes the torsional rigidity of the chain and thus the resistance of the chain to leakage of lubricant from the cartridge. Further, the spacers and the inner bushing are segmented such that each spacer has a radially inside contour with a varying inside diameter and the inner bushing has a radially outside contour with a varying outside diameter. The inside contour of each spacer mates with the outside contour of the inner bushing. Correspondingly, the length of the press fit between the inner bushing 34 and the spacers 36*a*, 36*b* is optimized, enhancing fixation of the spacers to the inner bushing and thus the links to the inner bushing, further promoting the torsional rigidity of the chain. The spacers and the inner bushing extend axially outward toward the collars into lubricated slidable contact therewith, eliminating the need for thrust rings between the collars and the spacers/inner bushing. Employment of the cartridge in the chain would thus promote the robustness, longevity, and cost effectiveness (i.e., cost per operating hour) of the chain.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
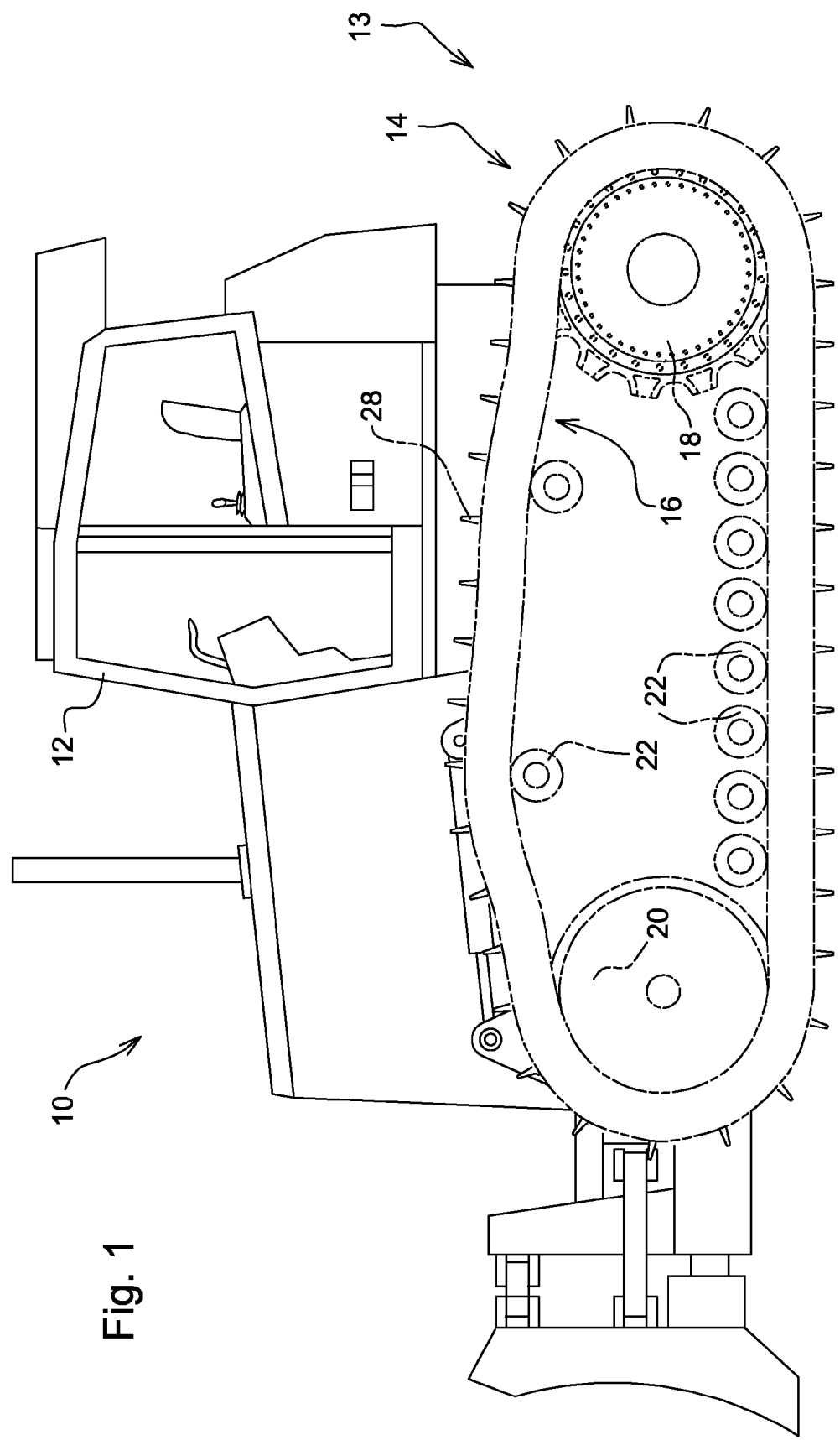
FIG. 1 is a side elevation view of a simplified track-type vehicle (e.g., crawler dozer) having an undercarriage shown diagrammatically.

Referring to FIG. 1, there is shown a simplified track-type vehicle 10, illustratively a crawler dozer, although it could be any track-type vehicle. The vehicle includes an operator's station 12 from which a human operator can control functions of the vehicle 10 including propulsion and steering. The undercarriage 13 of the vehicle 10 has a track 14 on each side of the vehicle 10 for propulsion and steering of the vehicle 10. In the illustrated example, each track 14 is trained about a rear drive sprocket 18, a front idler 20, and a number of rollers 22. A track frame of the undercarriage 13 (track frame not shown) is attached to the base machine and is located between the drive sprocket 18 and the idler 20 within the track 14, and the idler 20 and the rollers 21 are attached to the track frame.

Figure 2:
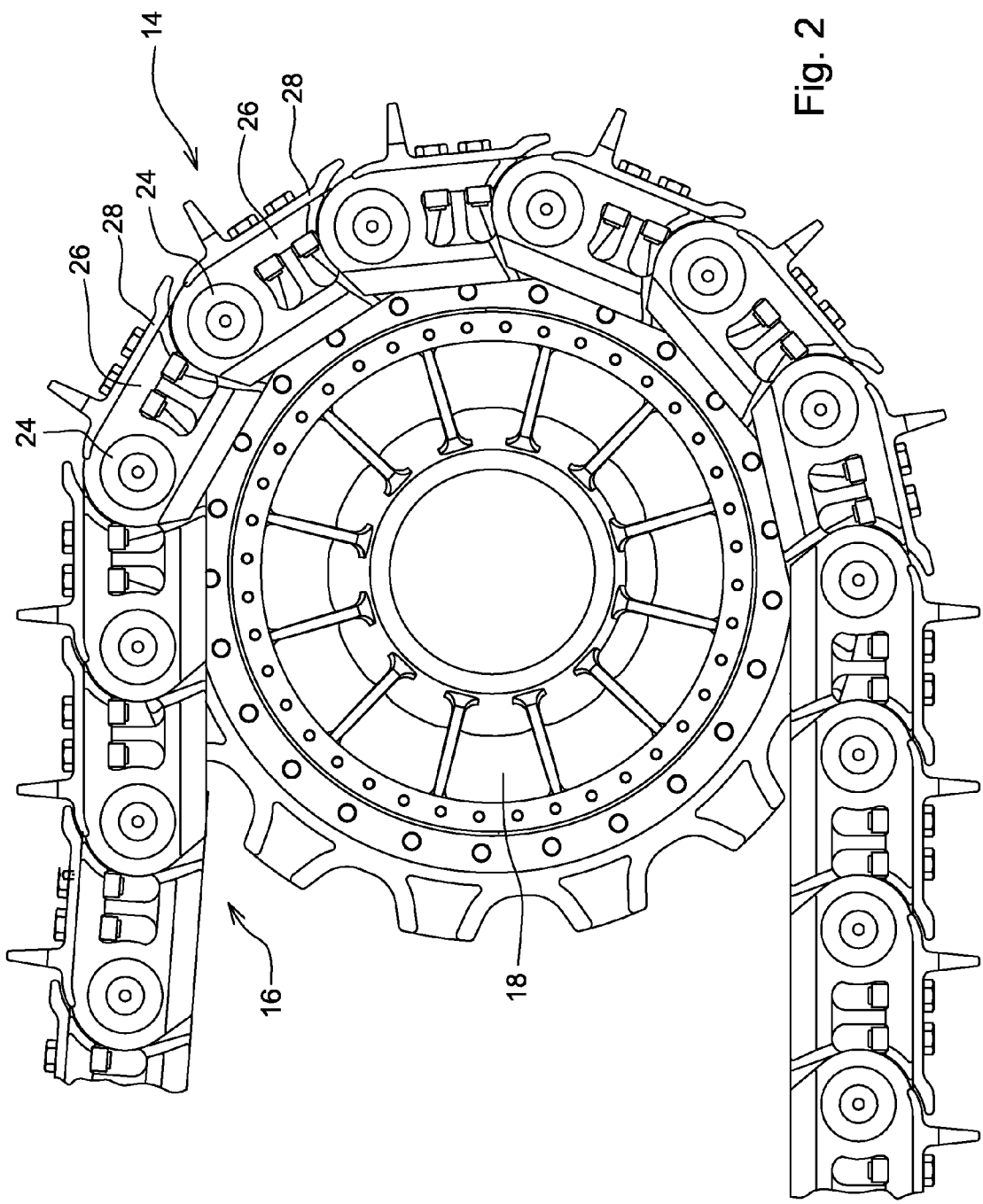
FIG. 2 is an enlarged side elevation view showing an endless track chain trained about a drive sprocket.
Figure 3:
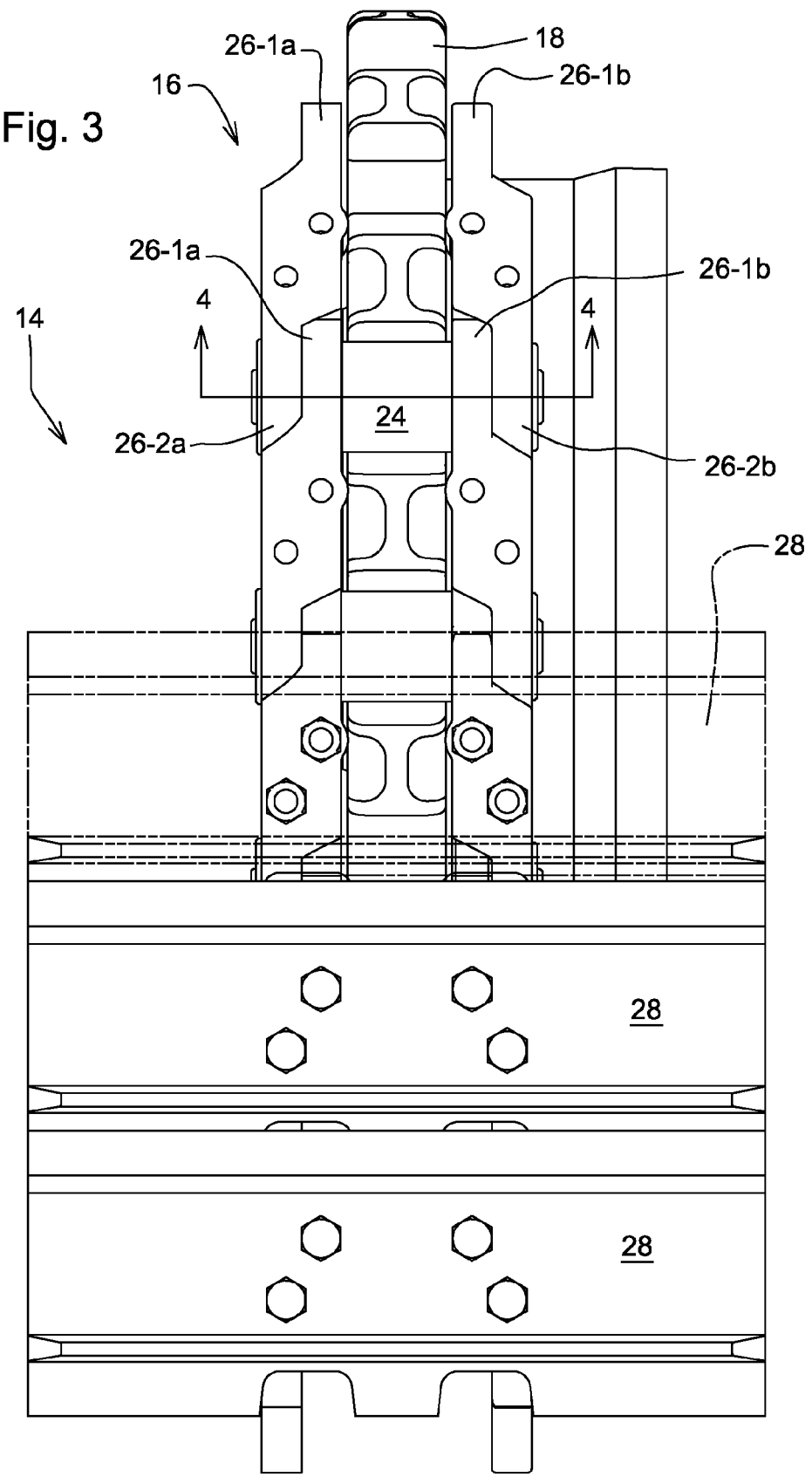
FIG. 3 is a plan view showing the track chain trained about the drive sprocket.

Referring to FIGS. 2 and 3, each track 14 includes an endless track chain 16 and ground-engaging shoes 28 attached to the chain 16. The chain 16 includes a number of joints each configured as a cartridge 24, offset links 26 interconnected by the cartridges 24, and four master links (not shown), two which are attached to a first cartridge 24 and two of which are attached to a second cartridge 24 such that the master links attached to the first cartridge 24 are respectively attached to the master links attached to the second cartridge 24. Shoes 28 are attached to the links 26 via bolts 30 (a shoe 28 would also be bolted to the master links). Each cartridge 24 acts as a pivot for links 26 attached to that cartridge 24 and adjacent cartridges 24 on opposite sides thereof. Further, as a wear component, it engages the sprocket 18 between the teeth thereof and the idler 20 during advancement of the track 14. As discussed in more detail below, each cartridge 24 is assembled as a cartridge before introduction to any of the links 26, enhancing the leakage resistance and manufacturing repeatability of the joint.

Figure 4:
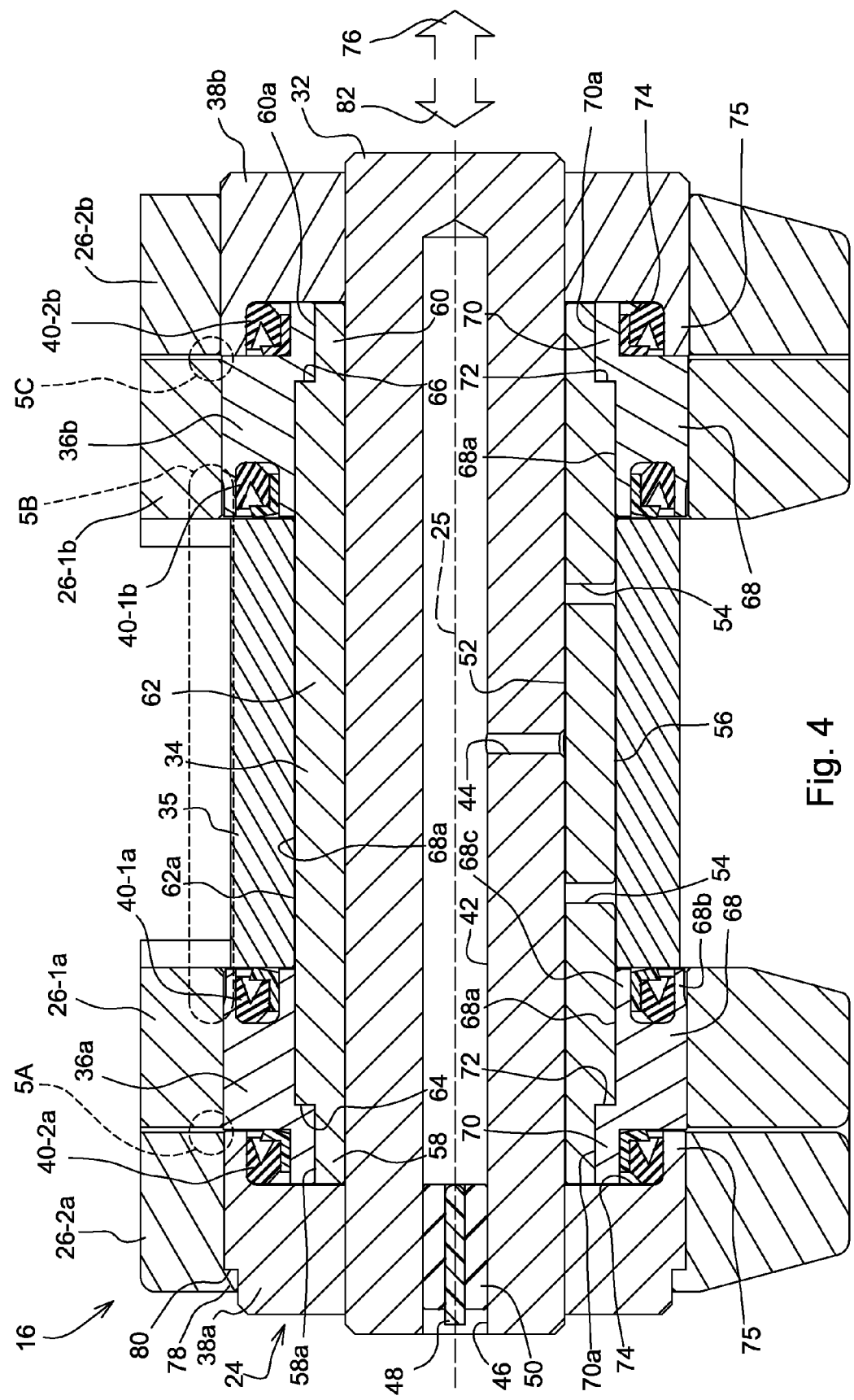
FIG. 4 is a sectional view taken along lines 4-4 of FIG. 3 showing a cartridge joined to a number of links of the track chain.

Referring to FIG. 4, as it relates to a cartridge 24 and the links 26 attached thereto, terms herein such as "radial" and "axial," and their variants, are relative to a central longitudinal axis 25 of the cartridge 24. A first link 26-1a and a second link 26-1b cooperate to provide a first link set, and a third link 26-2a and a fourth link 26-2b cooperate to provide a second link set. Each cartridge 24 is joined to and distinct from the first link 26-1a, the second link 26-1b, the third link 26-2a, and the fourth link 26-2b for relative rotation between the first link set with its links 26-1a. 26-1b and the second link set with its links 26-2a, 26-2b. A collar of the third link 26-2a is positioned axially outboard of a collar of the first link 26-1a, and a collar of the fourth link 26-2b is positioned axially outboard of a collar of the second link 26-2a.

The cartridge 24 includes a pin 32, an inner bushing 34 journalled on the pin 32 so as to be radially outward of and surround the pin 32 for relative rotation between the inner bushing 34 and the pin 32, an outer bushing 35 journalled on the inner bushing 34 so as to be radially outward of and surround the inner bushing 34 for relative rotation between the outer bushing 35 and the inner bushing 34, an annular first spacer 36a, an annular second spacer 36b, a first collar 38a, a second collar 38b, an annular first inboard seal 40-1a, an annular second inboard seal 40-1b, an annular first outboard seal 40-2a positioned axially outboard of the first inboard seal 40-1a, and an annular second outboard seal 40-2b positioned axially outboard of the second inboard seal 40-1b.

The first and second spacers 36a, 36b are positioned axially outboard of the outer bushing 35, fixed to the inner bushing 34, and fixed respectively to the collars of the first and second links 26-1a, 26-1b.

The first and second collars 33a, 38b are respectively positioned axially outboard of the first and second spacers 36a, 36b, fixed to the pin 32, and fixed respectively to the collars of the third and fourth links 26-2a, 26-2b.

The first and second seals 40-1a, 40-1b are captured respectively between the outer bushing 35 and the first and second spacers 36a, 36b. The third and fourth seals 40-1a, 40-1b are captured respectively between the first and second spacers 38a, 38b and the first and second collars 38a, 38b. Each seal 40-1a, 40-1b, 40-2a, 40-2b includes a seal loading element, made of, for example, nitrite, and a seal body loaded by the seal loading element to contact the respective component to establish a sealed connection therebetween and made of, for example, polyurethane.

The pin 32 is formed to include a blind axial channel 42. The axial channel 42 is closed at one end by the pin 32 itself, and has an opening 46 at the other end. The opening 48 is ordinarily closed by a plug 48 made of, for example, plastic (e.g., polyurethane) and received by a grommet 50 made of, for example, a soft rubber and mounted in the channel 42 to prevent leakage of lubricant through the opening 46 from the axial channel 42. The lubricant is a conventional lubricant, such as, for example, an 80W90-type of oil, which may have additives.

The pin 32 has a radial channel 44 to communicate lubricant between the axial channel 42 and an interface 52 between the inner bushing 34 and the pin 32 for lubrication of the interface 52 and relative rotation between the inner bushing 34 and the pin 32. The outer bushing 35 has a pair of radial channels 54 to communicate lubricant between the interface 52 and an interface 58 between the inner bushing 34 and the outer bushing 35 for lubrication of the interface 56 and relative rotation between the inner bushing 34 and the outer bushing 35. The channels 44, 54 are arranged toward the inside portion of the chain 18 for purposes of stress management (i.e., the inside portion being the portion that engages the drive sprocket 18, idler 20, and rollers 22).

The pin 32 has, for example, an outer diameter of 44.00 millimeters and an inner diameter of 14.00 millimeters. The outer diameter could be in the range of, for example, 42.00 to 44.00 millimeters to handle shear loading.

The inner bushing 34 is segmented in that it includes a first neck-down portion 58, a second neck-down portion 60 having the same outside diameter as the first neck-down portion 58, and an intermediate portion 62 extending between the first and second neck-down portions 58, 60 and having an outside diameter greater than the outside diameters of the first and second neck-down portion 58, 60. As such, the inner bushing 34 has a radially outside contour with a varying outside diameter. The neck-down portions 58, 60 and the intermediate portion 62 are axially aligned cylindrical sections. Exemplarily, the inner diameter of the inner bushing 34 is 44.125 millimeters, the intermediate portion 62 has an outer diameter of 64.25 millimeters so as to have a thickness of 10.06 millimeters, and the neck-down portions 58, 60 have an outside diameter of 56.25 millimeters so as to have a thickness of 6.05 millimeters.

The inner bushing 34 thus includes a radial first bushing shoulder 64 axially inboard of a first end of the inner bushing 34 and a radial second bushing shoulder 66 axially inboard of a second end of the inner bushing 34. The first bushing shoulder 64 extends radially between a cylindrical radially outside surface 62a of the intermediate portion 62, defining the outside diameter of the intermediate portion 62, and a cylindrical radially outside surface 58a of the first neck-down portion 58, defining the outside diameter of the first neck-down portion 58. Similarly, the second bushing shoulder 86 extends radially between the cylindrical radially outside surface 62a of the intermediate portion 62 and a cylindrical radially outside surface 60a of the second neck-down portion 60, defining the outside diameter of the second neck-down portion 60.

The outer bushing 35 is cylindrical in shape. It has, for example, an outside diameter of 90.00 millimeters and an inside diameter of 64.50 millimeters.

Each spacer 36a, 36b is segmented in that it comprises an axially elongated inboard portion 68 and an axially elongated outboard portion 70 axially outboard and radially inward of the inboard portion 68. Each spacer 36a, 36b thus includes a radial spacer shoulder 72 extending radially between a cylindrical radially inside surface 68a of the inboard portion 68, defining an inside diameter of the inboard portion 68, and a cylindrical radially inside surface 70a of the outboard portion 70, defining an inside diameter of the outboard portion 70. Each spacer 38a, 36b thus has a radially inside contour with a varying inside diameter. During assembly of the cartridge 24, the spacer 36a is pressed onto the inner bushing 34. Then, the seal 40-1a is inserted into the annular cavity of the spacer 36a, after which the outer bushing 35 is slipped onto the inner bushing 34. The seal 40-1b is placed in the cavity of the annular spacer 36b after which the spacer 36b is pressed onto the inner bushing 34. Separately, the seal 40-2a is placed into the counter-bore 74 of the collar 38a after which the collar 38a is pressed onto the pin 32. The sub-assembly of the spacers 38a, 38b, the inner and outer bushings 34, 35, and the seals 40-1a, 40-1b is then slipped onto the pin 32. Afterwards, the seal 40-2b is placed into the counter-bore 74 of collar 38b, and the collar 38b with the seal 40-2b is pressed onto the pin 32, completing assembly of the cartridge 24.

The bushings 34, 35 are mounted to the pin 32. The pin 32 and the inner bushing 34 are relatively positioned such that the inner bushing 34 surrounds the pin 32. The inner and outer bushings 34, 35 are relatively positioned such that the outer bushing 35 surrounds the intermediate portion 82 of the inner hushing 34.

The seals 40-*a*1, 40-*a*2 are mounted to the inboard portions 68 of the spacers 36*a*, 36*b*. The inboard portion 68 of the first spacer 38*a* receives the first seal 40-*a*1 in the annular cavity of that inboard portion 68 upon insertion therein. The inboard portion 68 of the second spacer 36*b* receives the second seal 40-*a*2 in the annular cavity of that inboard portion 68 upon insertion therein.

The first and second spacers 36*a*, 38*b* are press-fitted onto the inner bushing 34 until the spacer shoulders 72 of the first and second spacers 36*a*, 36*b* respectively engage the bushing shoulders 64, 66, thereby properly axially positioning the spacers 36*a*, 38*b* on the inner bushing 34. As such, each bushing shoulder 64, 66 acts as a spacer stop stopping axial movement of the respective spacer 36*a*, 36*b* along the bushing 34 so as to position that ring 38*a*, 36*b* axially on the hushing 34.

Thus, the inside surfaces 68*a* of the inboard portions 68 of the spacers 36*a*, 36*b* are press-fitted onto the outside surface 82*a* of the intermediate portion 62 of the inner bushing 34 such that the inside surfaces 68*a* and the outside surface 82*a* mate with one another, and the inside surfaces 70*a* of the outboard portions 70 of the spacers 36*a*, 36*b* are press-fitted onto the outside surfaces 58*a*, 80*a* of the neck-down portions 58, 80 of the inner bushing 34 such that the respective inside and outside surfaces 70*a*, 58*a*, 60*a* mate with one another. As such, the inboard portion 68 of the first spacer 38*a* is fixed to and surrounds the intermediate portion 62, the inboard portion 68 of the second spacer 36*b* is fixed to and surrounds the intermediate portion 62, the outboard portion 70 of the first spacer 36*a* is fixed to and surrounds the first neck-down portion 58, and the outboard portion 70 of the second spacer 38*b* is fixed to and surrounds the second neck-down portion 60, Each spacer 36*a*, 36*b* is fixed to the inner bushing 34 on both sides of the respective bushing shoulder 84, 66. Stated otherwise, the inside contour of each spacer 36*a*, 36*b* mates with the outside contour of the inner bushing 34. The length of the press fit between the inner bushing 34 and the spacers 38*a*, 36*b* is optimized; enhancing fixation of the spacers 38*a*, 38*b* to the inner bushing 34 and thus the links 26-1 as 26-1*b* to the inner bushing 34, promoting torsional rigidity of the chain 16.

The outer bushing 35 is thus captured between the first and second spacers 36*a*, 36*b* and between the first and second inboard seals 40-1*a*, 40-1*b* such that the seals 40-1*a*, 40-1*b* engage respective end faces of the outer bushing 35. A clearance is established between an annular outer flange 68*b* of the inboard portion 68 of each spacer 36*a*, 38*b* and a respective end face of the outer bushing 35, whereas an annular inner flange 68*c* of the inboard portion 68 of each spacer 36*a*, 38*b* and the respective end face of the outer bushing 35 cooperate to effectively provide a lubricated rotationally slidable contact zone, therebetween for relative rotation between that spacer 38*a*, 36*b* and the outer bushing 35.

Lubricant introduced into the axial channel 42 of the pin 32 enters between such components in such contact zones so as to establish a lubricated clearance between those components. As such, in those contact zones, the spacers 38*a*, 38*b* are positioned in rotationally slidable relationship with the outer bushing 35.

The collars 38*a*, 38*b* are mounted onto the pin 32 so as to be fixed thereto. More particularly, the collars 38*a*, 38*b* are press-fitted onto the pin 32 at opposite ends of the pin 32. The first neck-down portion 58 and the outboard portion 70 of the first spacer 36*a* extend axially outwardly together into the counter-bore 74 of the first collar 38*a* so as to terminate at their respective end faces, which are flush with one another and cooperate with the first collar 38*a* to effectively provide a lubricated rotationally slidable contact zone therebetween for relative rotation between the first collar 38*a* and the inner bushing 34/first spacer 36*a*. Lubricant introduced into the axial channel 42 of the pin 32 enters between such components in that contact zone so as to establish a lubricated clearance between those components. As such, in that contact zone, the inner bushing 34 and the first spacer 36*a* are positioned in rotationally slidable relationship with the first collar 38*a*.

Similarly, the second neck-down portion 80 and the outboard portion 70 of the second spacer 36*b* extend axially outwardly together into the counter-bore 74 of the second collar 38*b* so as to terminate at their respective end faces, which are flush with one another and cooperate with the second collar 38*b* to effectively provide a lubricated rotationally slidable contact zone therebetween for relative rotation between the second collar 38*b* and the inner bushing 34/second spacer 36*b*. Lubricant introduced into the axial channel 42 of the pin 32 enters between such components in that contact zone so as to establish a lubricated clearance between those components. As such, in that contact zone, he inner bushing 34 and the second spacer 38*b* are positioned in rotationally slidable relationship with the second collar 38*b*.

The cartridge 24 is efficient in its design, eliminating extra components. The cartridge 24 eliminates a thrust ring between the first collar 38*a* and the first spacer 38*a*/inner bushing 34 and a thrust ring between, the second collar 38*b* and the second spacer 36*b*/inner bushing 34. Rather, axial extension of the first neck-down portion 58 and the outboard portion 70 of the first spacer 36*a* toward the first collar 38*a* into sliding relationship therewith and axial extension of the second neck-down portion 60 and the outboard portion 70 of the second spacer 36*b* toward the second collar 38*b* into sliding relationship therewith axially position the inner bushing 34, the spacers 36*a*, 38*b*, and thus the outer bushing 35, as well as the first and second links 26-1*a*, 26-1*b*, establishing clearances between the inboard portion 68 of the first spacer 36*a* and an annular outer flange 75 of the first collar 38*a*, between the inboard portion 68 of the second spacer 38*b* and an annular outer flange 75 of the second collar 38*b*, between the links 26-1*a*, 26-2*a*, and between the links 26-1*b*, 26-2*b*.

The outboard seals 40-2*a*, 40-2*b* are thus captured in annular cavities respectively defined between the first and second spacers 36*a*, 36*b* and the first and second collars 38*a*, 38*b*. More particularly, the first outboard seal 4G-2*a* is positioned in the counter-bore 74 of the collar 38*a*. In an annular cavity defined between the inboard and outboard portions 68, 70 of the first spacer 36*a* and the first collar 38*a*, and the second outboard seal 40-2*a* is positioned in the counter-bore 74 of the collar 38*b* in an annular cavity defined between the inboard and outboard portions 68, 70 of the second spacer 36*b* and the second collar 38*b*.

The outside diameter of the inner bushing 34 steps down from the intermediate portion 82 to the neck-down portions 58, 80 to make room for the seals 40-2*a*, 40-2*b*, since the size of the seals 40-1*a*, 40-1*b*, 4Q-2*a*, 40-2*b* drives the geometry of the associated components of the cartridge 24. As alluded to above, such steps or shoulders 64, 68 formed in the inner bushing 34 also locate the outer bushing 35 at the right clearance between the spacers 38*a*, 36*b*. There is a small gap between the spacers 36*a*, 36*b* and the outer bushing 35 so that the outer bushing 35 can rotate freely, without loosing the seal pre-load on the seals 40-1*a*, 40-1*b*.

The pre-assembled cartridge nature of the cartridge 24 enhances manufacturability, leakage resistance, and serviceability of the chain 16. More particularly, the cartridge nature of the cartridge 24 promotes joint assembly repeatability and simplification of attachment to the links 26-1*a*, 26-1*b*, 26-2*a*, 26-2*b*. Leakage resistance is due to the tight tolerances that can be attained by pre-assembly. Further, it promotes serviceability in that the cartridge 24 can be readily replaced in the shop or in the field with minimal operational down-time.

During assembly of the chain 16, the links 26-1*a*, 26-1*b*, 26-2*a*, 26-2*b* are joined to the pre-assembled cartridge 24 using a hydraulic press. A collar of the link 26-1*b* is pressed onto the spacer 38*b* from a first end of the cartridge 24 (i.e., the end at which the collar 38*a* is located), so that the spacer 38*b* mates with the collar of the link 26-1*b*, establishing an interference fit therebetween, after which a collar at an opposite end of the link 26-1*b* is pressed onto the collar 38*b* of a first adjacent cartridge 24. A collar of the link 26-1*a* is then pressed onto the spacer 38*a* from the first end of the cartridge 24, so that the spacer 36*a* mates with the collar of the link 26-1*a*, establishing an interference fit therebetween; simultaneously, a collar at an opposite end of the link 26-1*a* is pressed onto the collar 38*a* of the first adjacent cartridge 24. Next, a collar of the link 26-2*b* is pressed onto the collar 38*b* from a second end of the cartridge 24 (i.e., the end at which the collar 38*b* is located), so that the collar 38*b* mates with the collar of the link 26-2*b*, establishing an interference fit therebetween, this step occurring after pressing a collar at an opposite end of the link 26-2*b* onto a spacer 36*b* of a second adjacent cartridge 24. Finally, a collar of the link 26-2*a* is pressed onto the collar 38*a* from the first end of the cartridge 24, so that the collar 38*a* mates with the collar of the link 26-2*b*, establishing an interference fit therebetween; simultaneously, a collar at an opposite end of the link 26-2*a* is pressed onto the spacer 36*a* of the second adjacent cartridge 24. Each spacer 38*a*, 36*b* has an annular groove formed in an outside surface of the radially outer flange 68*b* of the inboard portion 68 for stress relief in the interference fit between that spacer 36*a*, 36*b* and the respective link 26-1*a*, 26-1*b*.

This operation is repeated for each of the cartridges 24 except for two cartridges 24 which are joined by four master links. Two of the master links are joined to the spacers 36*a*, 38*b* of one of the cartridges 24, and the other two master links are joined to the collars 38*a*, 38*b* of the other cartridge 24. The master links joined to the spacers 38*a*, 36*b* of the first cartridge 24 are joined respectively to the master links joined to the collars 38*a*, 38*b* of the second cartridge 24. The cartridge 24 could be replaced by a fresh cartridge 24 (new or reconditioned) in the field, maintenance shop, or other location, when, for example, it has become worn. To remove a worn cartridge 24 from the chain 16, the entire cartridge 24 could be pushed out of the links 26-1*a*, 26-1*b*, 26-2*a*, 26-2*b* in the direction of arrow 78 using a hydraulic press. Alternatively, the pin 32 could be pushed out of the cartridge 24 with a hydraulic press, allowing the other components of the cartridge 24 to be removed individually and, if desired, the cartridge 24 to be re-built in the field. A fresh cartridge 24 could then be installed by inserting the cartridge 24 in the direction of arrow 82 into the collars of the links 26-1*a*, 26-1*b*, 26-2*a*, 26-2*b* using a hydraulic press so as to establish the respective interference fits between the cartridge components and the collars of those links. As such, only four links 26-1*a*, 26-1*b*, 26-2*a*, 26-2*b* are affected during cartridge removal and insertion from and into the chain 16, regardless whether the cartridge 24 is withdrawn in one piece or its components are disassembled individually, unlike disassembly in U.S. Pat. No. 8,738,680 in which six links need to be taken apart. The hydraulic press mentioned in this paragraph could be a field hydraulic press suitably designed for such removal and insertion operations.

Figure 5C:
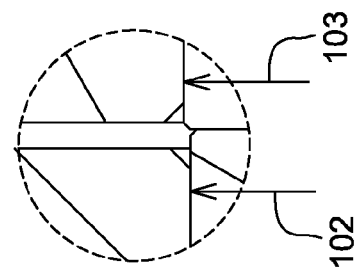
FIG. 5C is an enlarged view of region 5C of FIG. 4.
Figure 5B:
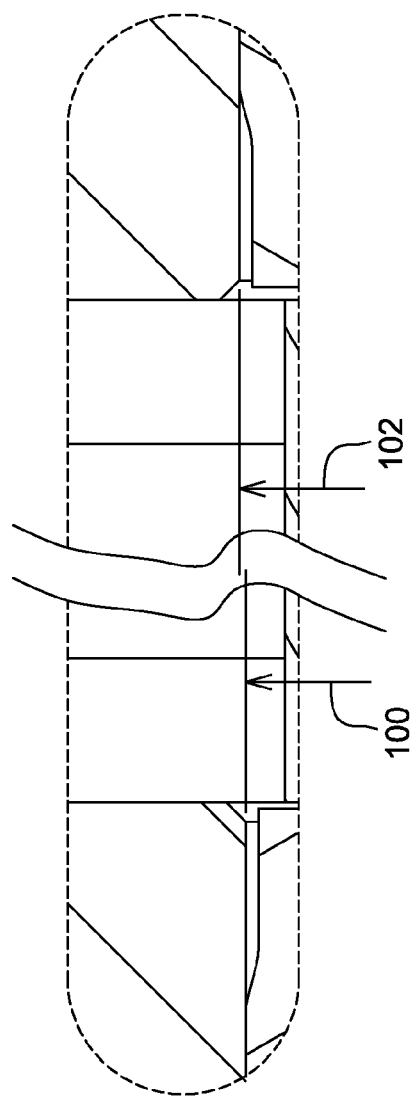
FIG. 5B is an enlarged view of region 5B of FIGS. 4.
Figure 5A:
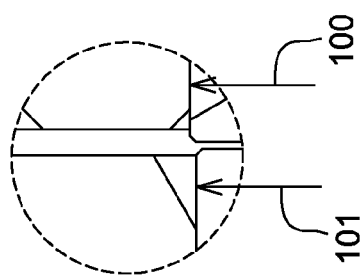
FIG. 5A is an enlarged view of region 5A of FIG. 4.

To facilitate such withdrawal and insertion, the outermost outside diameters of the first and second spacers 36*a*, 36*b* and the first and second collars 38*a*, 38*b* are different from one another. More particularly, the outermost outside diameter 100 of the first spacer 36*a* (e.g., 93.00 millimeters) is greater than the outermost outside diameter 101 of the first collar 38*a* (e.g., 92.50 millimeters) (FIG. 5A), the outermost outside diameter 102 of the second spacer 36*b* (e.g., 93.50 millimeters) is greater than the outermost outside diameter 100 of the first spacer 36*a* (FIG. 5B), and the outermost outside diameter 103 of the second collar 38*b* (e.g., 94.00 millimeters) is greater than the outermost outside diameter 102 of the second spacer 36*b* (FIG. 5C). Thus, the outermost outside diameters of those components increase in axially sequential order, so that the cartridge components can pass readily through the collars of the links with which they are not associated, avoiding undue scoring of the cartridge components and the links.

Axial insertion of the cartridge 24 into the collars of the links 26-1*a*, 26-1*b*, 26-2*a*, 26-2*b* is stopped by an annular radial retainer tab 78 formed on the third link 26-2*a*. The retainer tab 78 engages a shoulder 80 of the first collar 38*a*, thereby acting as a cartridge stop. The shoulder 80 is formed between an axially inboard portion of the collar 38*a*, defining the outermost diameter of the collar 38*a*, and an axially outboard neck-down portion. The shoulder 80 and such axially outboard neck-down portion cooperate to define an annular groove formed in the collar 38*a* and arranged to receive the radial retainer tab 78 when the cartridge 24 is installed.

The fourth link 26-2*b* lacks a radial retainer tab 78 corresponding to the radial retainer tab 78 of the third link 26-2*a*, and the second collar 38*b* lacks a shoulder 80 corresponding to the shoulder 80 of the first collar 38*a*. Such omission of the tab 78 from the link 26-2*b* and shoulder 80 from the collar 38*b* allows the cartridge 24 to be inserted into the collars of the links 26-1*a*, 26-1*b*, 26-2*a*, 26-2*b* from the right side thereof (as viewed in FIG. 4) in the direction of arrow 82 and withdrawn from the collars of the links 26-1*a*, 26-1*b*, 26-2*a*, 26-2*b* from the right side thereof (as view in FIG. 4) in the direction of arrow 76.

In use, the cartridge 24 acts as a joint for the links 26-1*a*, 26-1*b*, 26-2*a*, 26-2*b*, allowing relative rotation between the first and second links 26-1*a*, 26-1*b* and the third and fourth links 26-2*a*, 26-2*b*. The outer bushing 35 is freely rotatable about the inner bushing 34, as when the bushing 35 engages and is driven by the sprocket 18 (which may have 13 teeth), thereby minimizing the amount of wear on the outer bushing 35. Torsional rigidity of the chain 15 is maximized due to fixation of the first and second links 26-1*a*, 26-1*b* to the inner bushing 34 via the first and second spacers 38*a*, 36*b*, respectively. The cartridge 24 is thus designed for high impact.

Other measures could be taken to further retain the pin 32 in place within the cartridge 24. For example, retaining rings could be used between the pin 32 and the collars 38*a*, 38*b*. In such a case, an annular groove may be formed in the pin 32 therearound at each end of the pin 32. A retaining ring may be fitted into each such groove so as to contact a respective collar 38*a*, 38*b*, further retaining the pin 32 in place. In another example, the collars 38*a*, 38*b* may be welded (e.g., laser-welded) to the pin 32. Such retention mechanisms may be employed individually or collectively, along with the press-fits between the collars 38*a*, 38*b* and the pin 32.

Regarding materials, the pin 32, bushings 34, 35, spacers 38a, 36b, collars 38a, 38b, and links 26-1a, 26-1b, 26-2a, 26-2b may be made of, for example, an alloy steel conventional in the undercarriage industry. Boron, chromium molybdenum, and manganese may be included with the base material of such component.

The metal components of the cartridge 24 (i.e., pin 32, inner and outer bushings 34, 35, spacers 36a, 36b, and collars 38a, 38b) and the links 26-1a, 26-1b, 26-2a, 26-2b would likely be made of a conventional material. The pin 32, spacer 36a, 36b, and collars 38a, 38b may be made of the base material used for pins on conventional sealed-and-lubricated chains (SALT chains) (i.e., chains with a pin, a bushing journalled on the pin, two links press-fitted to the bushing, and two links press-fitted to the pin). For example, such components may be made of an alloy steel with a carbon content of 0.40% to 0.45% and suitable alloying elements, such as a 1045 steel-type of pin material which is heat treatable and common in the undercarriage industry, or, alternatively, a 4140 steel-type of pin material capable of being heat treated to a higher hardness level.

The inner and outer bushings 34, 35 may be made of the base material used for bushings on conventional SALT chains. In an example, the material for the bushings 34, 35 may be an alloy steel with a 0.44% carbon content.

The components of the cartridge 24 and the links 26-1a, 26-1b, 26-2a, 26-2b may be hardened in a conventional manner in the undercarriage industry. The degree of hardening would depend on the machine platform and specific applications. The pin 32 and links 26-1a, 26-1b, 26-2a, 26-2b may be hardened using conventional hardening processes to conventional hardness levels for such components (e.g., induction hardening and/or other forms of heat treatment depending on the economics and requirements of the specific component). The inner and outer bushings 34, 35, spacers 36a, 36b, and collars 38a, 38b may be through-hardened, with a hardness level of, for example, 48 to 52 HRc (i.e., Hardness Rockwell C), with attention to a softer core. It is contemplated that the heat treating operations associated with the metal components of the cartridge 24 and the links 26-1a, 26-1b, 26-2a, 26-2b may be tweaked to attain desired results, i.e., optimum strength with minimal brittleness.

While the disclosure has been illustrated and described in detail in the drawings and foregoing description, such illustration and description are to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. An endless track chain for use with a track-type vehicle, the endless track chain comprising:
    a first link set and a second link set, the first link set comprising a first link and a second link, the second link set comprising a third link and a fourth link, and
    a cartridge for relative rotation between the first link set and the second link set, the cartridge comprising:
        a pin,
        an inner bushing journalled on the pin for relative rotation therebetween,
        an outer bushing journalled on the inner bushing for relative rotation therebetween,
        an annular first spacer and an annular second spacer, the first and second spacers positioned axially outboard of the outer bushing, fixed to the inner bushing, and fixed respectively to the first and second links,
        a first collar and a second collar, the first and second collars positioned respectively axially outboard of the first and second spacers, fixed to the pin, and fixed respectively to the third and fourth links,
        an annular first seal and an annular second seal, the first and second seals captured between the outer bushing and the first and second spacers, and
        an annular third seal and an annular fourth seal, the third and fourth seals captured respectively between the first and second spacers and the first and second collars, wherein the inner bushing comprises a radial first bushing shoulder axially inboard of a first end of the inner bushing and a radial second bushing shoulder axially inboard of a second end of the inner bushing, the first spacer comprises a radial first spacer shoulder engaging the first bushing shoulder, and the second spacer comprises a radial second spacer shoulder engaging the second bushing shoulder.

2. The track chain of claim 1, wherein the outermost outside diameter of the first spacer is greater than the outermost outside diameter of the first collar, the outermost outside diameter of the second spacer is greater than the outermost outside diameter of the first spacer, and the outermost outside diameter of the second collar is greater than the outermost outside diameter of the second spacer.

3. The track chain of claim 2, wherein the third link comprises a radial retainer tab engaging a shoulder of the first collar, the fourth link lacks a radial retainer tab corresponding to the radial retainer tab of the third link, and the second collar lacks a shoulder corresponding to the shoulder of the first collar.

4. The track chain of claim 1, wherein the third link comprises a radial retainer tab engaging a shoulder of the first collar, the fourth link lacks a radial retainer tab corresponding to the radial retainer tab of the third link, and the second collar lacks a shoulder corresponding to the shoulder of the first collar.

5. The track chain of claim 1, wherein the inner bushing comprises a plurality of axially aligned cylindrical sections, and adjacent cylindrical sections of the plurality of axially aligned cylindrical sections have outside diameters different from one another.

6. The track chain of claim 1, wherein each of the first spacer and the second spacer comprises an axially elongated inboard portion, an axially elongated outboard portion axially outboard and radially inward of the inboard portion, and a radial shoulder extending between a radially inside surface of the inboard portion and a radially inside surface of the outboard portion, the inboard portion of the first spacer receives the first seal in a pocket of that inboard portion, the inboard portion of the second spacer receives the second seal in a pocket of that inboard portion, the outboard portion of the first spacer extends into a counter-bore of the first collar, and the outboard portion of the second spacer extends into a counter-bore of the second collar.

7. An endless track chain for use with a track-type vehicle, the endless track chain comprising:
    a first link set and a second link set, the first link set comprising a first link and a second link, the second link set comprising a third link and a fourth link, and a cartridge for relative rotation between the first link set and the second link set, the cartridge comprising:

a pin, an inner bushing journalled on the pin for relative rotation therebetween, an outer bushing journalled on the inner bushing for relative rotation therebetween, an annular first spacer and an annular second spacer, the first and second spacers positioned axially outboard of the outer bushing, fixed to the inner bushing, and fixed respectively to the first and second links, a first collar and a second collar, the first and second collars positioned respectively axially outboard of the first and second spacers, fixed to the pin, and fixed respectively to the third and fourth links, an annular first seal and an annular second seal, the first and second seals captured between the outer bushing and the first and second spacers, and an annular third seal and an annular fourth seal, the third and fourth seals captured respectively between the first and second spacers and the first and second collars, wherein each of the first collar and the second collar comprises a counter-bore, the inner bushing and the first spacer extend into the counter-bore of the first collar so as to cooperate with the first collar to effectively provide a lubricated rotationally slidable contact zone therebetween, and the inner bushing and the second spacer extend into the counter-bore of the second collar so as to cooperate with the second collar to effectively provide a lubricated rotationally slidable contact zone therebetween.

8. The track chain of claim 1, wherein each of the first and second spacers has a radially inside contour with a varying inside diameter, the inner bushing has a radially outside contour with a varying outside diameter, and the inside contour of each of the first and second spacers mates with the outside contour of the inner bushing.

9. The track chain of claim 1, wherein the inner bushing comprises a first neck-down portion, a second neck-down portion, and an intermediate portion extending between the first and second neck-down portions and having an outside diameter greater than an outside diameter of the first neck-down portion and an outside diameter of the second neck-down portion such that the first bushing shoulder extends between a cylindrical radially outside surface of the intermediate portion, defining the outside diameter of the intermediate portion, and a cylindrical radially outside surface of the first neck-down portion, defining the outside diameter of the first neck-down portion, and the second bushing shoulder extends between the cylindrical radially outside surface of the intermediate portion and a cylindrical radially outside surface of the second neck-down portion, defining the outside diameter of the second neck-down portion.

10. The track chain of claim 1, wherein each of the first spacer and the second spacer comprises an axially elongated inboard portion, an axially elongated outboard portion axially outboard and radially inward of the inboard portion, and the respective spacer shoulder extending between a cylindrical radially inside surface of the inboard portion, defining an inside diameter of the inboard portion, and a cylindrical radially inside surface of the outboard portion, defining an inside diameter of the outboard portion, the inboard portion of the first spacer receives the first seal in a pocket of that inboard portion, the inboard portion of the second spacer receives the second seal in a pocket of that inboard portion.

11. The track chain of claim 1, wherein the inner bushing comprises a first neck-down portion, a second neck-down portion, and an intermediate portion extending between the first and second neck-down portions and having an outside diameter greater than an outside diameter of the first neck-down portion and an outside diameter of the second neck-down portion such that the first bushing shoulder extends between a cylindrical radially outside surface of the intermediate portion, defining the outside diameter of the intermediate portion, and a cylindrical radially outside surface of the first neck-down portion, defining the outside diameter of the first neck-down portion, and the second bushing shoulder extends between the cylindrical radially outside surface of the intermediate portion and a cylindrical radially outside surface of the second neck-down portion, defining the outside diameter of the second neck-down portion, each of the first spacer and the second spacer comprises an axially elongated inboard portion, an axially elongated outboard portion axially outboard and radially inward of the inboard portion, and the respective spacer shoulder extending between a cylindrical radially inside surface of the inboard portion, defining an inside diameter of the inboard portion, and a cylindrical radially inside surface of the outboard portion, defining an inside diameter of the outboard portion, the outer bushing surrounds the intermediate portion, the inboard portion of the first spacer is fixed to the first link and is fixed to and surrounds the intermediate portion, the inboard portion of the second spacer is fixed to the second link and is fixed to and surrounds the intermediate portion, the outboard portion of the first spacer is fixed to and surrounds the first neck-down portion, and the outboard portion of the second spacer is fixed to and surrounds the second neck-down portion.

12. The track chain of claim 11, wherein the first neck-down portion and the outboard portion of the first spacer extend axially outwardly together into a counter-bore of the first collar so as to terminate at their respective end faces which are flush with one another and cooperate with the first collar to effectively provide a lubricated rotationally slidable contact zone therebetween, and the second neck-down portion and the outboard portion of the second spacer extend axially outwardly together into a counter-bore of the second collar so as to terminate at their respective end faces which are flush with one another and cooperate with the second collar to effectively provide a lubricated rotationally slidable contact zone therebetween.

13. A cartridge for use in an endless track chain, the endless track chain comprising a first link set and a second link set, the first link set comprising a first link and a second link, the second link set comprising a third link and a fourth link, the cartridge adapted for relative rotation between the first link set and the second link set, the cartridge comprising:

a pin, an inner bushing journalled on the pin for relative rotation therebetween, an outer bushing journalled on the inner bushing for relative rotation therebetween, an annular first spacer and an annular second spacer, the first and second spacers positioned axially outboard of the outer bushing, fixed to the inner bushing, and configured to be fixed respectively to the first and second links, a first collar and a second collar, the first and second collars positioned respectively axially outboard of the first and second spacers, fixed to the pin, and configured to be fixed respectively to the third and fourth links, an annular first seal and an annular second seal, the first and second seals captured respectively between the outer bushing and the first and second spacers, and an annular third seal and an annular fourth seal, the third and fourth seals captured respectively between the first and second spacers and the first and second collars, wherein the inner bushing comprises a radial first bushing shoulder axially inboard of a first end of the inner bushing and a radial second bushing shoulder axially inboard of a second end of the inner bushing, the first spacer comprises a radial first spacer shoulder engaging the first bushing shoulder, and the second spacer comprises a radial second spacer shoulder engaging the second bushing shoulder.

14. The cartridge of claim 13, wherein the outermost outside diameter of the first spacer is greater than the outermost outside diameter of the first collar, the outermost outside diameter of the second spacer is greater than the outermost outside diameter of the first spacer, and the outermost outside diameter of the second collar is greater than the outermost outside diameter of the second spacer.

15. The cartridge of claim 13, wherein the first collar comprises a shoulder configured to engage a radial retainer tab of the third link, and the second collar lacks a shoulder corresponding to the shoulder of the first collar.

16. The cartridge of claim 13, wherein the inner bushing comprises a first neck-down portion, a second neck-down portion, and an intermediate portion extending between the first and second neck-down portions and having an outside diameter greater than an outside diameter of the first neck-down portion and an outside diameter of the second neck-down portion such that the first bushing shoulder extends between a cylindrical radially outside surface of the intermediate portion, defining the outside diameter of the intermediate portion, and a cylindrical radially outside surface of the first neck-down portion, defining the outside diameter of the first neck-down portion, and the second bushing shoulder extends between the cylindrical radially outside surface of the intermediate portion and a cylindrical radially outside surface of the second neck-down portion, defining the outside diameter of the second neck-down portion.

17. The cartridge of claim 13, wherein each of the first spacer and the second spacer comprises an axially elongated inboard portion, an axially elongated outboard portion axially outboard and radially inward of the inboard portion, and the respective spacer shoulder extending between a cylindrical radially inside surface of the inboard portion, defining an inside diameter of the inboard portion, and a cylindrical radially inside surface of the outboard portion, defining an inside diameter of the outboard portion, the inboard portion of the first spacer receives the first seal in a pocket of that inboard portion, the inboard portion of the second spacer receives the second seal in a pocket of that inboard portion.

18. The cartridge of claim 13, wherein the inner bushing comprises a first neck-down portion, a second neck-down portion, and an intermediate portion extending between the first and second neck-down portions and having an outside diameter greater than an outside diameter of the first neck-down portion and an outside diameter of the second neck-down portion such that the first bushing shoulder extends between a cylindrical radially outside surface of the intermediate portion, defining the outside diameter of the intermediate portion, and a cylindrical radially outside surface of the first neck-down portion, defining the outside diameter of the first neck-down portion, and the second bushing shoulder extends between the cylindrical radially outside surface of the intermediate portion and a cylindrical radially outside surface of the second neck-down portion, defining the outside diameter of the second neck-down portion, each of the first spacer and the second spacer comprises an axially elongated inboard portion, an axially elongated outboard portion axially outboard and radially inward of the inboard portion, and the respective spacer shoulder extending between a cylindrical radially inside surface of the inboard portion, defining an inside diameter of the inboard portion, and a cylindrical radially inside surface of the outboard portion, defining an inside diameter of the outboard portion, the inboard portion of the first spacer receives the first seal in a pocket of that inboard portion, the inboard portion of the second spacer receives the second seal in a pocket of that inboard portion, the first collar and the inboard and outboard portions of the first spacer cooperate to define a pocket in which the third seal is positioned, the second collar and the inboard and outboard potions of the second spacer cooperate to define a pocket in which the fourth seal is positioned, the outer bushing surrounds the intermediate portion, the inboard portion of the first spacer is configured to be fixed to the first link and is fixed to and surrounds the intermediate portion, the inboard portion of the second spacer is configured to be fixed to the second link and is fixed to and surrounds the intermediate portion, the outboard portion of the first spacer is fixed to and surrounds the first neck-down portion, and the outboard portion of the second spacer is fixed to and surrounds the second neck-down portion.

* * * * *